United States Patent [19]

Inoue

[11] Patent Number: 5,737,409
[45] Date of Patent: Apr. 7, 1998

[54] ECHO REMOVING APPARATUS

[75] Inventor: Akira Inoue, Tokyo, Japan

[73] Assignee: Sony Corporation, Tokyo, Japan

[21] Appl. No.: 611,199

[22] Filed: Mar. 5, 1996

[30] Foreign Application Priority Data

Mar. 9, 1995 [JP] Japan .................................. 7-050025

[51] Int. Cl.$^6$ ........................................................ H04M 9/00
[52] U.S. Cl. ............................ 379/410; 379/390; 379/406; 381/93
[58] Field of Search ................................. 379/410, 411, 379/412, 406, 407, 408, 390; 370/32.1; 381/73.1, 93, 94, 95, 96, 66

[56] References Cited

U.S. PATENT DOCUMENTS

| 5,408,530 | 4/1995 | Makino et al. | 379/410 |
| 5,463,618 | 10/1995 | Furukawa et al. | 379/410 |
| 5,477,534 | 12/1995 | Kusano | 379/410 |
| 5,572,621 | 11/1996 | Martin | 395/2.36 |

*Primary Examiner*—Krista Zele
*Assistant Examiner*—Jacques M. Saint-Surin
*Attorney, Agent, or Firm*—Jay H. Maioli

[57] ABSTRACT

An echo removing apparatus for reducing the echo caused by sound generated turning from a speaker round to a microphone of a small-sized sound generated communication terminal, such as a portable telephone. A speaker output signal X(k), sent from a terminal 11 to a speaker 12, is sent to a smoothed power value calculation circuit 21 of a tap coefficient estimation circuit 21 where a smoothed input signal power value Px(k), which is a smoothed version of the square sum values, is found and sent to a tap coefficient updating circuit 22. Using the smoothed input signal power value Px(k), the tap coefficient updating circuit 22 updates tap coefficients of a filter 15. The filter 15 filters the speaker output signal X(k) to output a pseudo echo signal which is sent to a subtractor 14 where it is subtracted from a microphone input signal collected by a microphone 13. The filter tap coefficients may be prohibited form being fluctuated and echo removing characteristics of the echo removing apparatus may be stabilized without increasing the processing volume for tap coefficient estimation.

2 Claims, 8 Drawing Sheets

ECHO REMOVING APPARATUS

BACKGROUND OF THE INVENTION

This invention relates to an echo removing apparatus and, more particularly, to an echo removing apparatus for reducing the echo caused by sound generated turning round from a speaker to a microphone of a small-sized sound generated communication terminal, such as a portable telephone.

In keeping up with reduction in size of sound generated communication terminal, such as a portable telephone, the effect of the echo produced by sound generated turning round from the sound generated-receiving speaker to a sound generated-sending microphone becomes hardly negligible. For removing the echo caused by sound generated turning round on the transmitter/receiver, an echo removing apparatus or an echo canceler shown for example in FIG. 1 is employed.

Figure 1:
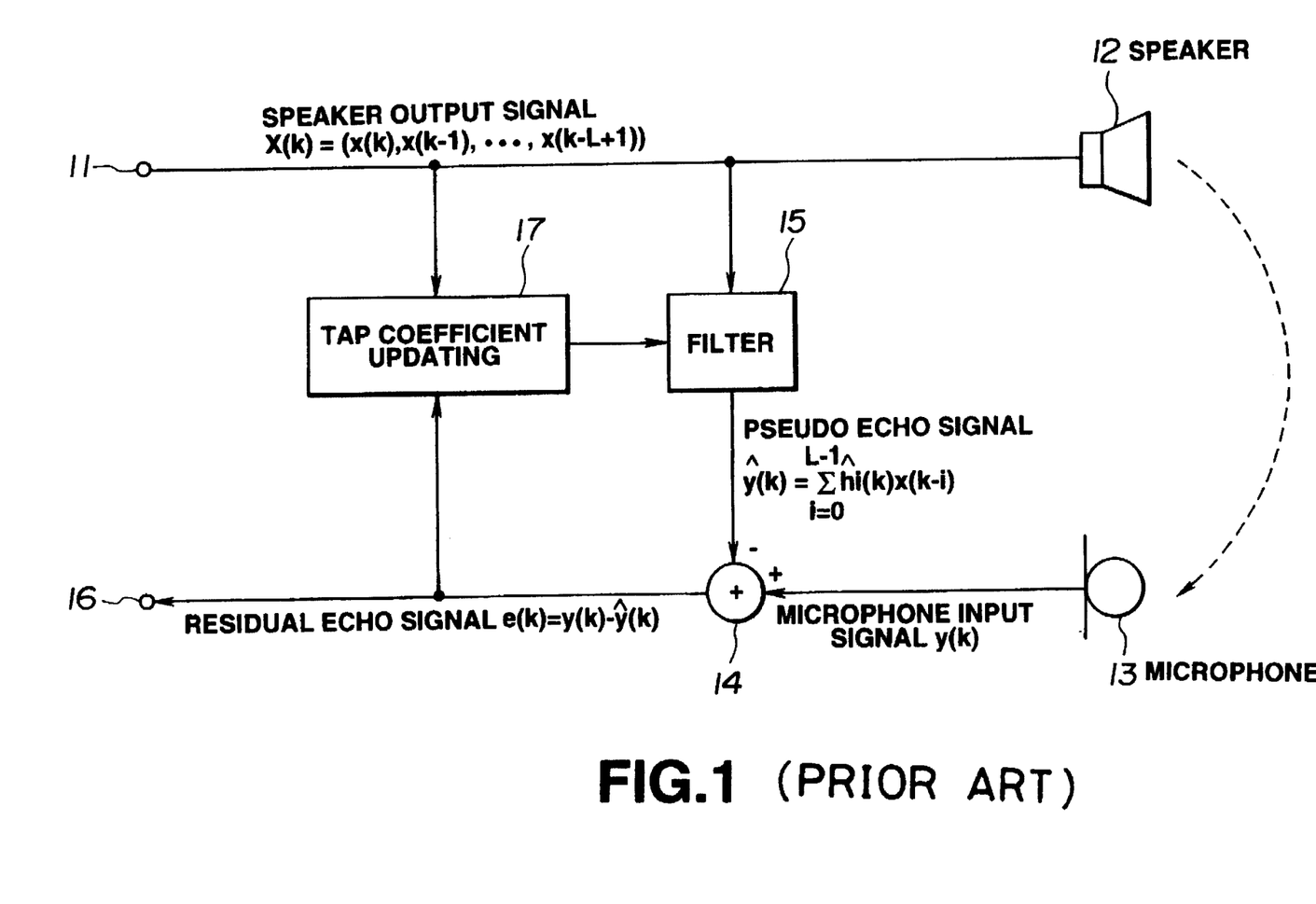
FIG. 1 is a schematic block diagram showing an arrangement of a conventional echo removing apparatus.

Referring to FIG. 1, a terminal 11 receives a speaker output signal x(k) transmitted from a communication partner to a speaker 12, where k denotes a sample number or a time position of discrete signals. A microphone input signal y(k), collected by a microphone 1B and thereby converted into an electrical signal, is supplied along with a pseudo echo signal supplied from a filter circuit 15 to a subtractor 15. The subtractor subtracts the pseudo echo signal supplied from the microphone input signal to form a resultant echo-reduced signal or a residual echo signal e(k) which is supplied to an input terminal 16. In a portable telephone, the speaker 12 and the microphone 13 are usually arranged close to each other.

A filter circuit 15 is comprised of a so-called finite impulse response (FIR) filter. The filter circuit has its filter coefficients or ta coefficients controlled by a tap coefficient estimation circuit 17. The tap coefficient estimation circuit sequentially updates the tap coefficients of the filter by a suitable adaptive algorithm based upon the speaker output signal x(k) as an input signal or upon the residual echo signal e(k) as an output signal. For the adaptive algorithm, a so-called learning identification method or a normalized least mean square (LMS) method is widely employed.

If, with the number L of filter taps, the speaker output signal as a filter tap input signal is represented by a vector $$X(k)=(x(k), x(k-1), \ldots, x(k-L+1))$$

and the filter tape coefficient is represented by a vector $$\hat{H}(k)=(\hat{h}_0(k), \hat{h}_1(k), \ldots \hat{h}_{L-1}(k))$$

the pseudo echo signal obtained by the filter circuit 15 (FIR filter) is found, by multiplying the tap input with a tap coefficient, by the following equation:

$$\hat{y}(k) = \sum_{i=0}^{L-1} \hat{h}_i(k)x(k-i) \quad (1)$$

This pseudo echo signal is subtracted from the microphone input signal y(k) to give the residual echo signal e(k) represented by the following equation:

$$e(k)=y(k)-\hat{y}(k)$$

This represents the echo-reduced output signal or an echo canceler output signal. The tap coefficient estimation circuit 17 estimates and updates the tap coefficient based upon the residual echo signal e(k) and the tap input signal X(k).

Figure 2:
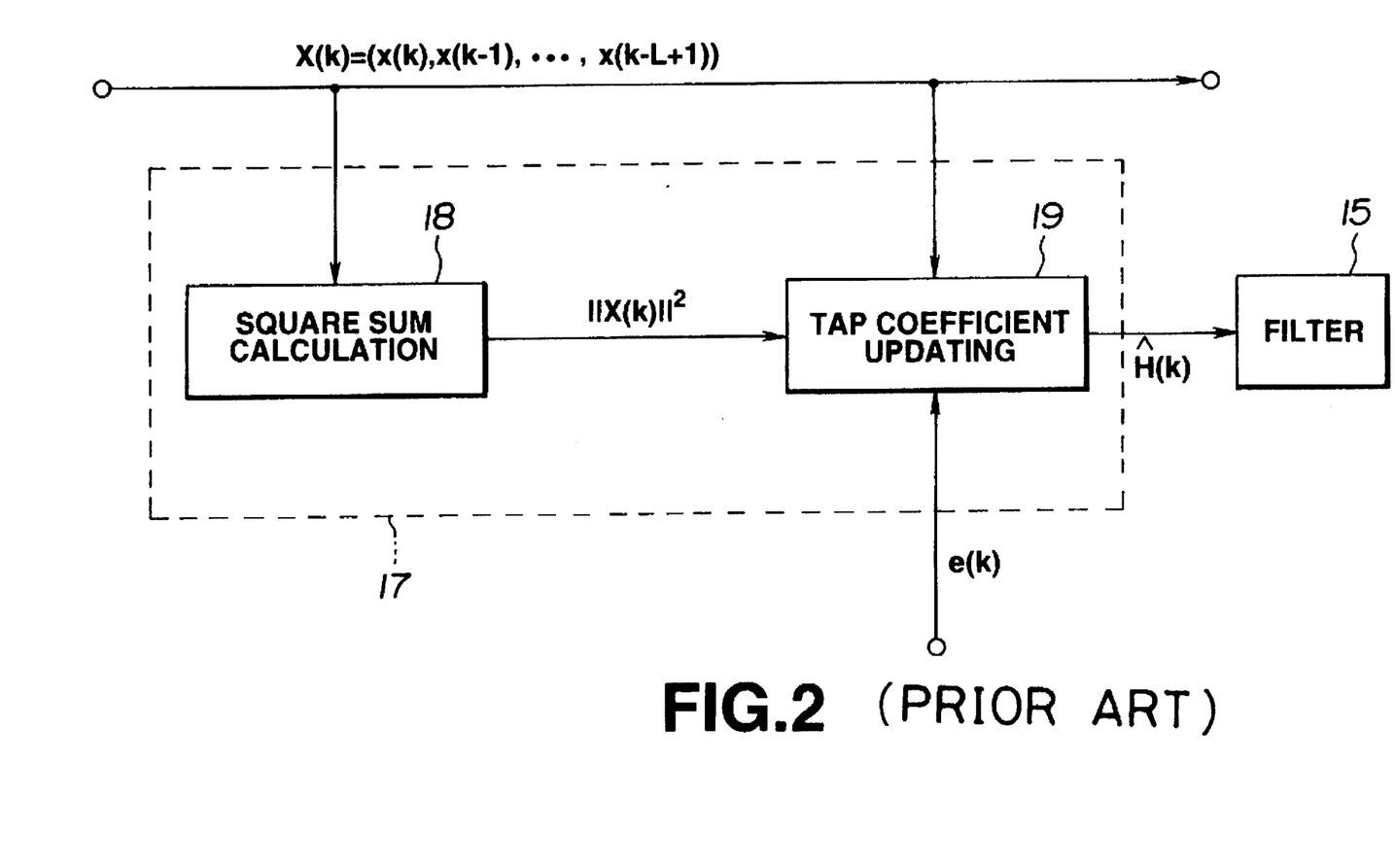
FIG. 2 is a block diagram showing an illustrative example of a ta coefficient estimation circuit employed in the echo removing apparatus shown in FIG. 1.

FIG. 2 shows an illustrative example of employing the algorithm of the above-mentioned normalized LMS method as the tap coefficient estimation circuit 17.

Referring to FIG. 2, the tap coefficient estimating circuit 17 is made up of a square sum calculation circuit 18 and a tap coefficient updating circuit 19. The square sum calculation circuit 18 calculates, from the tap input of the speaker output signal, or $$X(k)=(x(k), x(k-1), \ldots, x(k-L+1))$$

a square sum $$\|X(k)\|^2 = \sum_{i=0}^{L-1} X(k-i)^2 \quad (2)$$

This square sum is equivalent to an input signal power. Using the square sum, thus found, the residual echo signal e(k) and the tap input signal X(k), the tap coefficient updating circuit 19 updates the tap coefficient to a value found by the following equation (3):

$$\hat{H}(k+1) = \hat{H}(k) + \frac{\mu e(k)X(k)}{\|X(k)\|^2} \quad (3)$$

where μ is a constant such that 0<μ<2. From this equation (3), each component is represented by the following equation:

$$\hat{h}_i(k+1) = \hat{h}_i(k) + \frac{\mu e(k)X(k-1)}{\|X(k)\|^2} \quad (4)$$

where i=0, 1, . . . , L.

Figure 3:
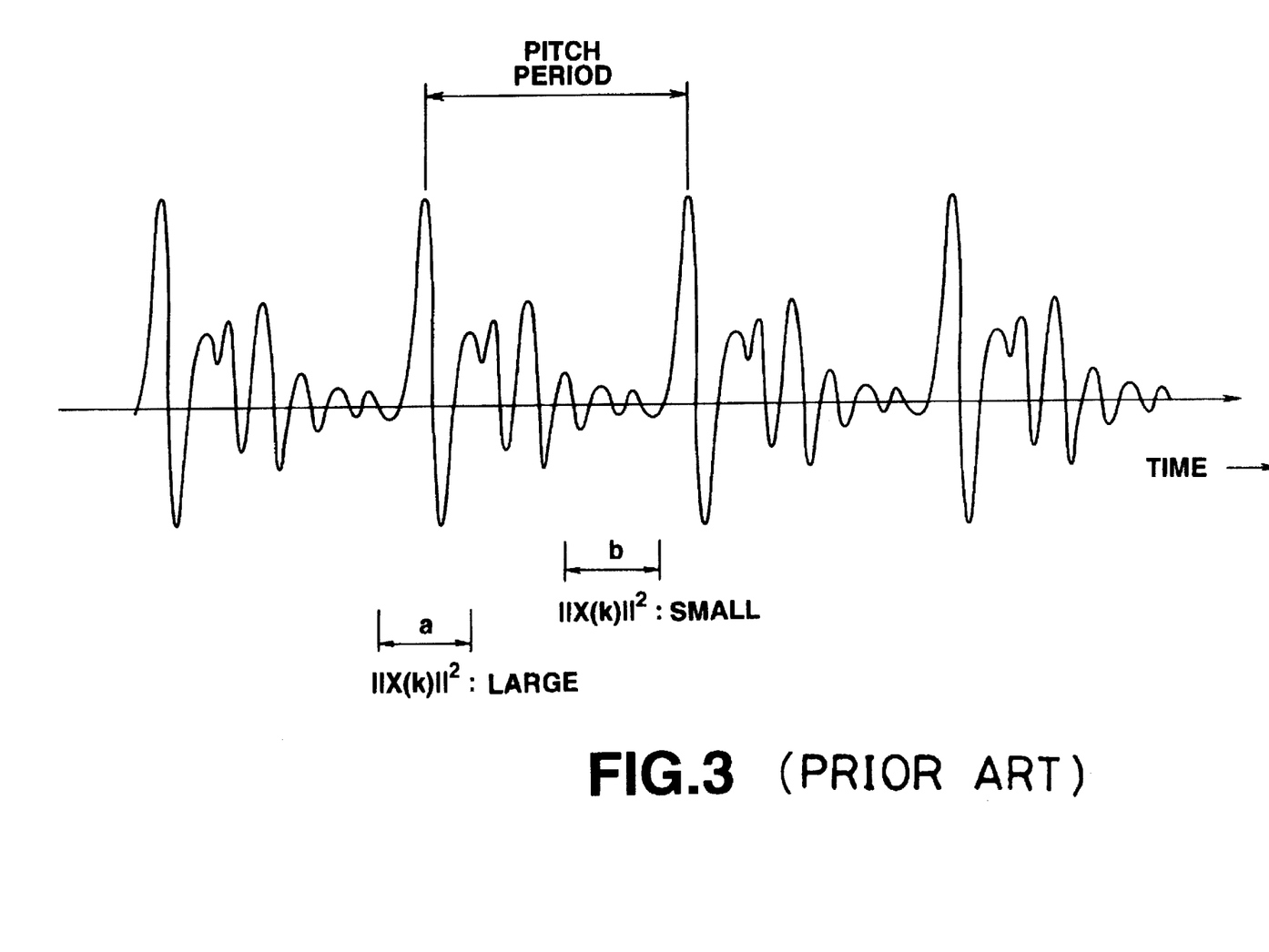
FIG. 3 is a graph showing the relation between the pitch period of an input signals and the domain for calculation of an input signal power.
Figure 4:
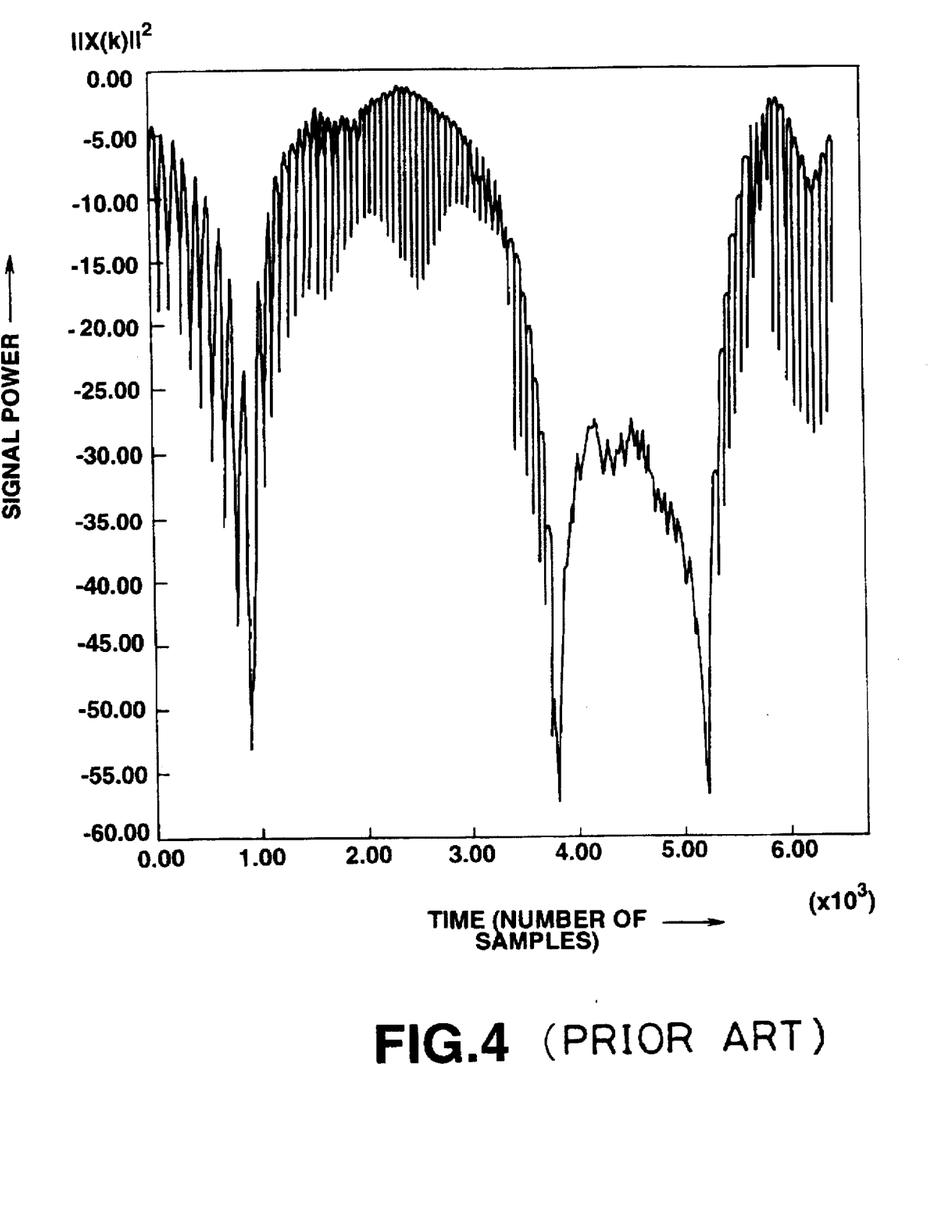
FIG. 4 is a graph showing the manner of fluctuations of the input signal power in case of a smaller number of filter taps.

The tap input signal X(k) to the filter is a sound generated signal, and usually a periodic function having a pitch period structure, as shown in FIG. 3. If the sampling frequency is 8 kHz, the pitch period is 50 to 90 samples and 20 to 35 samples for a male sound generated and for a female sound generated, respectively. Thus, if the number of filter taps L is not sufficiently larger than the number of samples of the pitch period, the input signal power as found in connection with the ranges a or b of FIG. 3 by the equation (2) is varied significantly as shown in FIG. 4.

If the input signal power is changed significantly in this manner, the tap coefficient updated by the equation (3) is fluctuated, such that stabilized echo removing characteristics cannot be achieved.

This raises a serious problem with, for example, the number of filter taps of 50 or less, in the case of a small-sized echo removing apparatus directed to-removing the echo produced by turning round from the speaker 12 to the microphone 13 of the portable telephone.

OBJECT AND SUMMARY OF THE INVENTION

It is therefore an object of the present invention to provide an echo removing apparatus whereby the input signal power fluctuation may be suppressed for assuring stable echo removing characteristics or echo canceling characteristics.

According to the present invention, there is provided an echo removing apparatus for removing the echo produced by the turning of sound generated from sound generating means round to sound collecting means arranged in proximity to sound generating means. The echo removing apparatus has filter means for outputting a pseudo echo signal estimating an echo component derived from a generated sound signal supplied to sound generating means and echo component turning round to said collecting means, subtracting means for subtracting the pseudo echo signal supplied from the filter means from the collected signal supplied from the collecting means, and filter coefficient estimation means for estimating and updating the filter coefficient of the filter means using a smoothed version of the generated sound signal.

The filter coefficient estimation means uses a mean power over L samples of past N samples of the generated sound signal, where L is the number of taps of the filter means and N is the number larger than L.

The filter coefficient estimation means uses an exponentially smoothed square sum of past generated sound signals as the smoothed value.

By employing a smoothed value during filter estimation, the filter coefficient or the tap coefficient may be prevented from being suppressed thus achieving stabilized echo removing or echo cancellation characteristics.

EMBODIMENTS

Referring to the drawings, illustrative embodiments of the present invention will be explained in detail.

Figure 5:
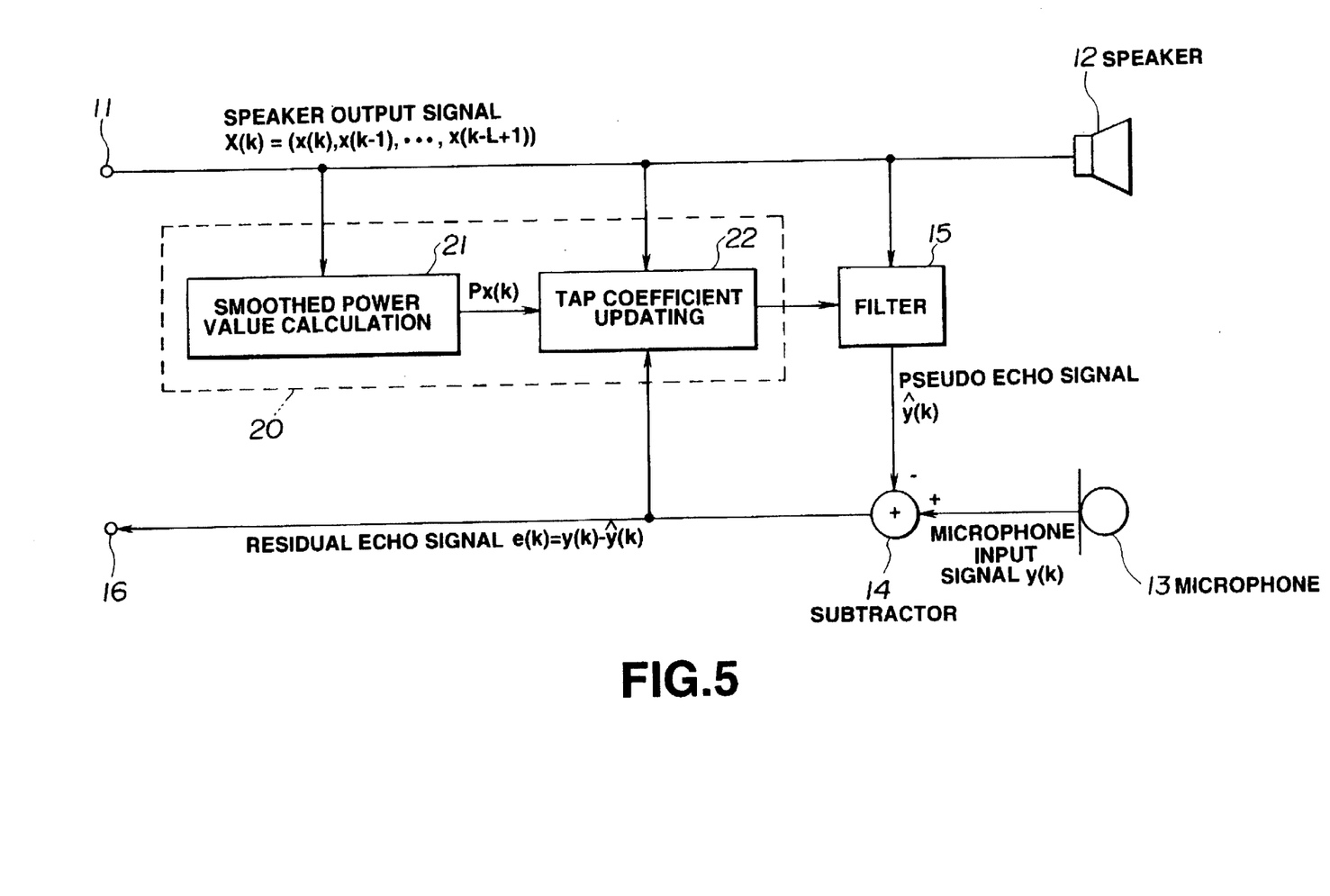
FIG. 5 is a schematic block diagram showing an arrangement of an echo removing apparatus embodying the present invention.

FIG. 5 schematically shows an embodiment of an echo removing apparatus according to the present invention.

To a terminal 11 is supplied a speaker output signal x(k) as a generated sound signal transmitted from a communication partner to a speaker 12, as sound generating means. A microphone input signal y(k), collected by a microphone 13, arranged as collection means close to the speaker 12 as sound generating means, and thereby converted into an electrical signal, is supplied along with a pseudo echo signal supplied from a filter circuit 15 to a subtractor 14 as echo removing means. The subtractor 14 subtracts the pseudo echo signal supplied from the microphone input signal y(k), to form a resultant echo-reduced signal or a residual echo signal e(k), which is supplied to an input terminal 16.

In the present echo removing apparatus, employed as an example for a sound generated communication terminal of, for example, a portable telephone, the speaker 12 and the microphone 13 are usually arranged close to each other as a handset of a portable telephone.

A filter circuit 15 is comprised of a so-called finite impulse response (FIR) filter. The filter circuit has its filter coefficients or tap coefficients controlled by a tap coefficient estimation circuit 20 as filter coefficient estimation means. The tap coefficient estimation circuit sequentially updates the filter tap coefficients by a suitable adaptive algorithm based upon the speaker output signal x(k) as an input signal to the echo removing apparatus or upon the residual echo signal e(k) as an output signal. For the adaptive algorithm, a so-called learning identification method or a normalized least mean square (LMS) method is widely employed.

The tap coefficient estimation circuit 20 is comprised of a smoothed power value calculating circuit 21 and a tap coefficient updating circuit 22. The smoothed power value calculating circuit 21 generates, in place of the square sum of samples for the number of taps L in the prior-art system, a smoothed input signal power Px(k), as a smoothed version of the enunciated signal, that is a smoothed power of the speaker output signal x(k) which is an input signal to the echo removing apparatus. The smoothed input signal power Px(k) from the smoothed power value calculation circuit 21 is supplied to the tap coefficient updating circuit 22. The tap coefficient updating circuit 22 updates the tap coefficients based upon a number of vectors X(k)=(x(k), x(k−1), . . . , x(k−L+1), corresponding to the number of tabs L of the speaker output signal x(k), the residual echo signal e(k) and the smoothed input signal power value Px(k) from the smoothed power value calculating circuit 21.

That is, in the algorithm of the learning identification method, it is sufficient if the square sum of the denominator of the equation (3):

$$\hat{H}(k-1) = \hat{H}(k) + \frac{Ie(k)X(k)}{\|X(k)\|^2} \quad (3)$$

that is the equation for updating the coefficient according to the prior art system, is $$\|X(k)\|^2 = L^*E[|x(k)|^2],$$

where $E[|x(k)|^2]$ is an expected value of $|x(k)|^2$.

Thus, by employing, as a denominator of the equation (3), an input signal power value smoothed by a method as later explained, in place of the square sum of a number of speaker output signals x(k) or input signals equal to the number of taps L, it becomes possible to remove fluctuations in the input signal level.

Figure 6:
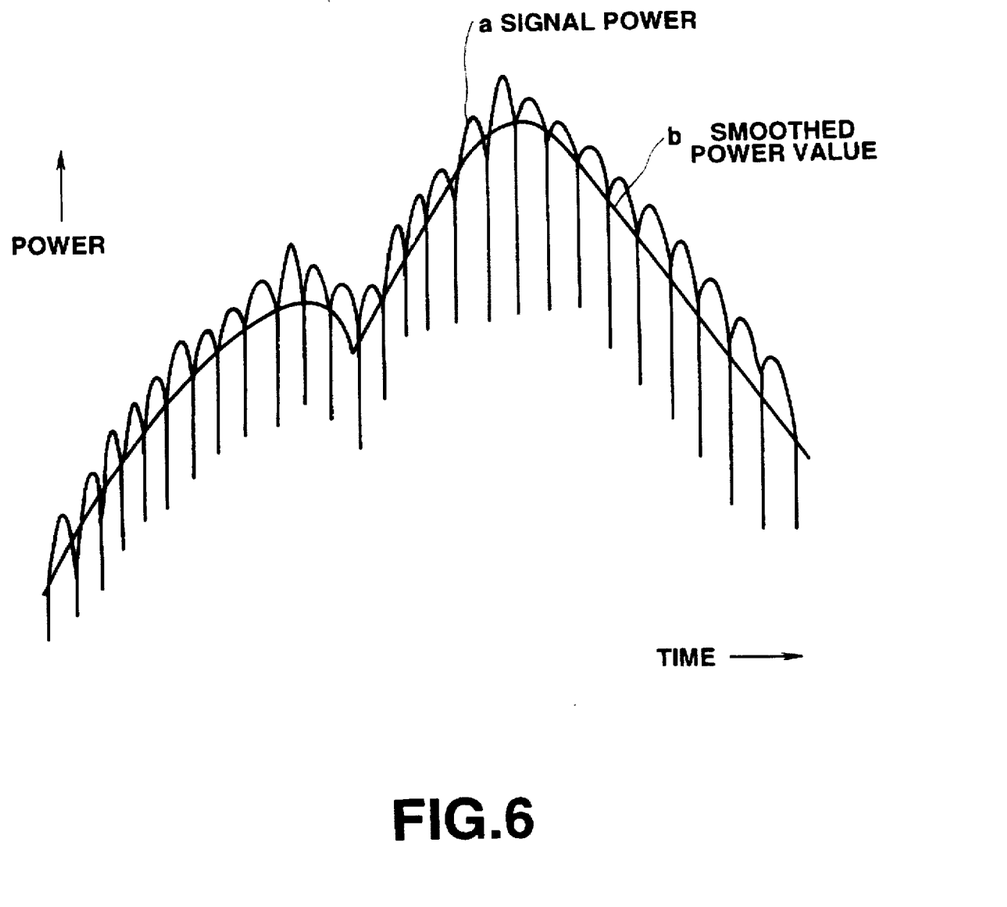
FIG. 6 is a graph for illustrating smoothing of an input signal power.

An illustrative example of the smoothed input signal power is shown in FIG. 6, wherein curves a and b denote an input signal power calculated as the square sum of the denominator of the equation (3) and the smoothed input signal power Px(k) as the smoothed input signal power. It is seen from FIG. 6 that, on smoothing, the square sum of the curve a having significant fluctuations is freed of the fluctuations, as shown by the curve b.

Using the smoothed input signal power value Px(k), tap coefficient updating by the tap coefficient updating circuit 22 is carried out by the equation:

$$\hat{H}(k+1) = \hat{H}(k) + \frac{\mu e(k)X(k)}{P_x(k)} \quad (5)$$

The tap coefficients, calculated by the equation (5), are freed of fluctuations.

In this manner, by smoothing the input signal power, and by employing the input signal power or the smoothed input signal power value Px(k), it becomes possible to prohibit ill effects due to fluctuations at the time of estimation of the tap coefficients to achieve stable echo removing characteristics or echo cancellation characteristics even if the square sum as the input signal power is fluctuated due to the small number of taps L and hence the stable echo cancellation characteristics cannot be assured. The processing volume required at this time for estimating tap coefficients substantially equal to that required for the learning identification method of the conventional practice suffices.

Next, preferred illustrative constructions of the smoothed power value calculating circuit 21 in the tap coefficient estimation circuit 20 in the embodiment of FIG. 5 will be explained.

In an illustrative construction of the smoothed power value calculating circuit 21, the power of speaker output signal x(k) as the generated sound signal entering the echo removing apparatus is calculated by calculating the mean value over L square sums of a large number N of square sums of past input signals, where N>L, in place of calculating L square sums of past input samples, for removing fluctuations in the input signal power.

The smoothed input signal power Px(k) at this time is found by $$P_x(k) = \frac{L}{N} \sum_{i=1}^{N-1} |X(k-i)|^2 \qquad (6)$$

This is equivalent to finding a mean value or a normalized value over L samples of square sum values of past N samples of the input signals. The smoothed input signal power value Px(k) as found by the equation (6) is substituted into the equation (5) for estimating and updating the next tap coefficient from the current tap coefficient.

In a second illustrative construction of the smoothed power value calculating circuit 21, the smoothed input signal power value Px(k) is found by exponential smoothing. This illustrative example is explained by referring to FIG. 7.

Figure 7:
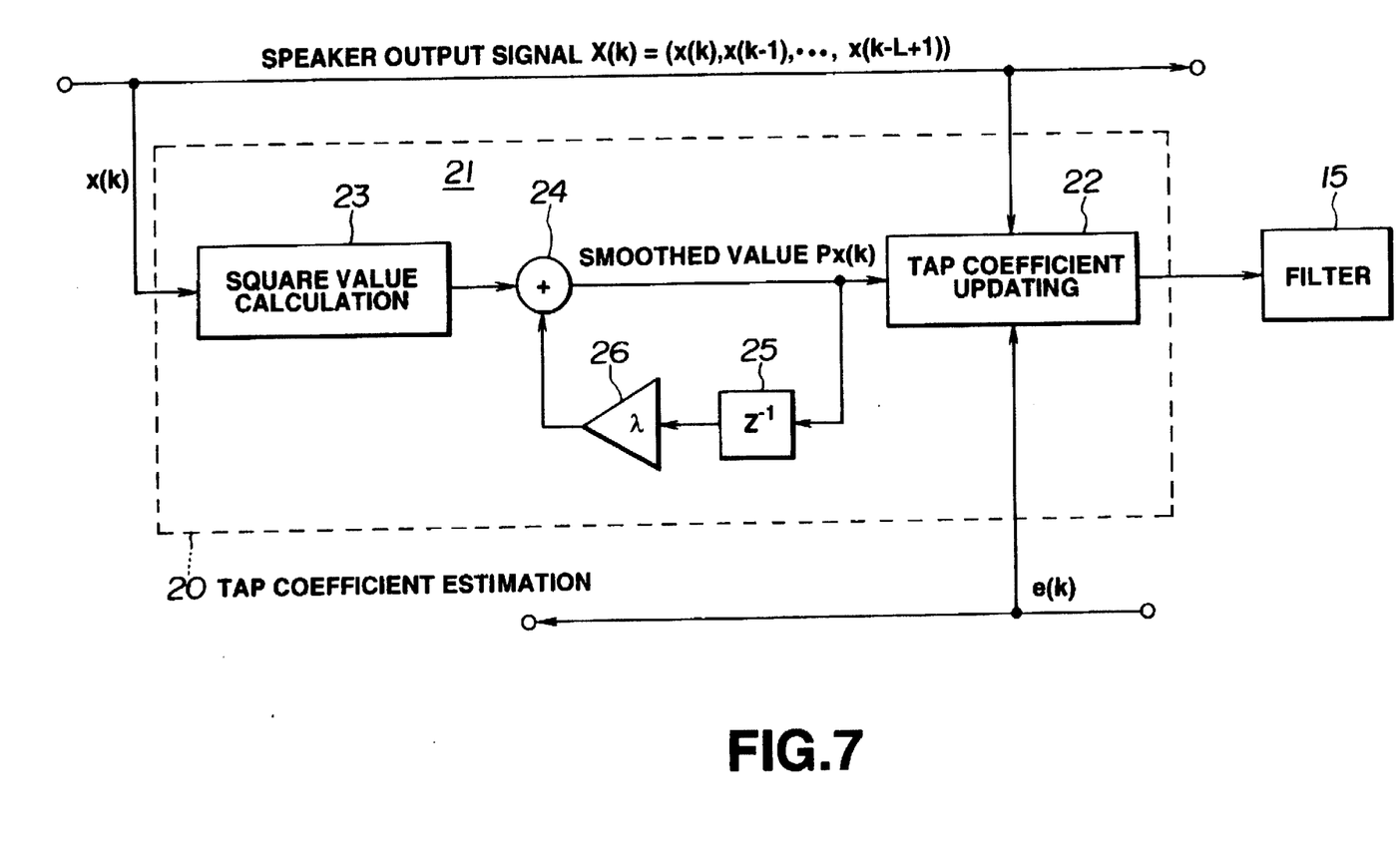
FIG. 7 is a block circuit diagram showing an illustrative example of a tap coefficient estimation circuit of the echo removing apparatus shown in FIG. 1.

In the second illustrative example, the smoothed input signal power value Px(k) is found by the equation (7):

$$P_x(k) = \sum_{i=0}^{\infty} \lambda^i |X(k-i)|^2 \qquad (7)$$

where $\lambda$ is a constant such that $0<\lambda<1$. The smoothed input signal power value Px(k), calculated by the equation (7), is the square sum of past input signal samples exponentially smoothed with a time constant $1/(1-\lambda)$. in effect, the equation (7) may be represented by the following recurrence formula:

$$P_x(k) = \lambda P_x(k-1) + |X(k)|^2 \qquad (8)$$

FIG. 7 shows an illustrative construction of the tap coefficient estimation circuit 20 for implementing the equation (8).

In FIG. 7, to the smoothed power value calculation circuit 21 of the tap coefficient estimation circuit 20 is supplied the speaker output signal x(k), as an input signal to the echo removing apparatus. A square value calculation circuit 23 finds a square value $|x(k)|^2$ which is sent to an adder 24. An output of the adder 24 is fed back to the adder 24 via a one-sample delay element 25 and a coefficient multiplier 26. The adder 24 outputs a smoothed input signal power value Px(k). That is, the one-sample delay element 25 outputs a smoothed input signal power value Px(k-1), delayed by one sample, to the coefficient multiplier 26, where it is multiplied with $\lambda$ to give $\lambda$Px(k-1). This value $\lambda$Px(k-1) is summed by the adder 24 to $|x(k)|^2$ to find the smoothed input signal power value Px(k) of the equation (8). The smoothed input signal power value Px(k), outputted by the adder 24, is provided to the tap coefficient updating circuit 22.

The tap coefficient updating circuit 22 calculates the formula (5), using the smoothed input signal power value Px(k) from the smoothed power value calculation circuit 21, for updating the tap coefficients of the filter circuit 15.

Meanwhile, the respective components of the tap coefficient vector of the equation (5) are given by:

$$\hat{h}_i(k+1) = \hat{h}_i(k) + \frac{\mu e(k) X(k-1)}{P_x(k)}, \qquad (9)$$

$$(i = 0, 1, \ldots, L-1)$$

Figure 8:
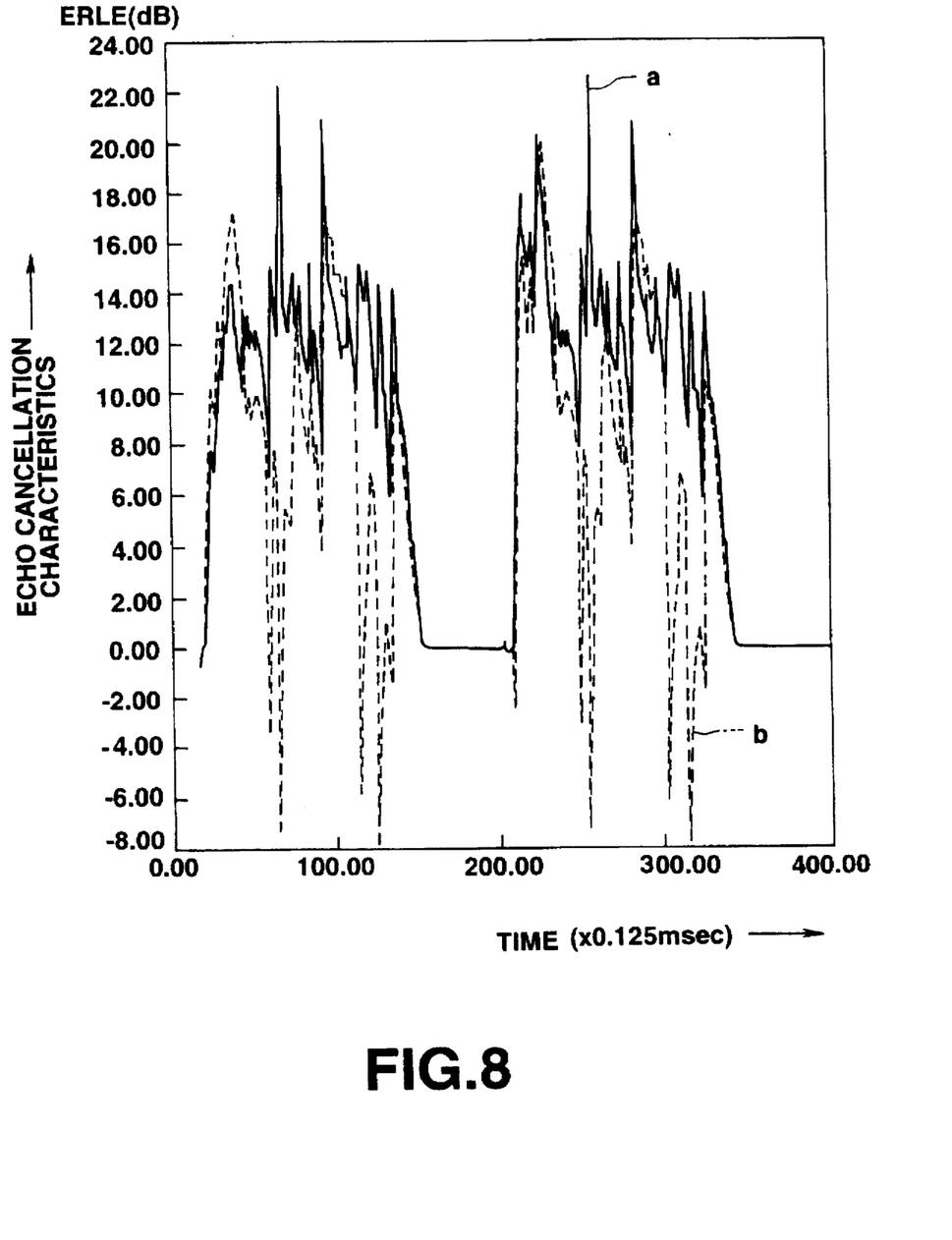
FIG. 8 is a graph showing echo cancellation characteristics.

FIG. 8 shows echo cancellation characteristics (curve a) of the echo removing apparatus which has performed tap coefficient estimation by using the algorithm of the second example and echo cancellation characteristics (curve b) obtained by using the conventional algorithm. In the example of FIG. 8, an adaptive filter having the number of taps L equal to 40 is shown.

The echo cancellation characteristics ERLE, plotted on the ordinate of FIG. 8, are defined by $$ERLE = 10 \log_{10} \frac{\text{input echo power}}{\text{residual echo power}} \qquad (10)$$

$$= 10 \log_{10} \frac{E[|y(k)|^2]}{E[|e(k)|^2]}$$

and, the larger the value, the better are the characteristics. Meanwhile, E[ ] in the equation (10) is a function which restores an expected value within the bracket [ ].

It is seen from FIG. 7 that the echo removing apparatus of the instant embodiment exhibits echo cancellation characteristics which are more stable and more satisfactory than those of the conventional apparatus.

In addition, about one-half the processing volume for the algorithm of the conventional learning identification method suffices for estimation of the tap coefficient of the instant embodiment.

Thus the echo removing apparatus of the instant embodiment may be conveniently applied to a small-sized portable telephone f the number of taps of the adaptive filter is as small as tens.

The present invention is not limited to the above-described embodiments. For example, it may be applied to a variety of sound generated communication terminals as well as to the portable telephone. Sound generating means and collecting means are not limited to a speaker or to a microphone, while a variety of adaptive filters may be employed as filter means in addition to FIR filters. In addition, filter coefficients may be estimated by a variety of adaptive algorithms without being limited to the learning identification method.

What is claimed is:

1. An echo removing apparatus for removing an echo produced by the return of sound generated from sound generating means to sound collecting means arranged in proximity to said sound generating means, comprising:

filter means for outputting a pseudo echo signal estimating an echo component derived from a generated sound signal supplied to said sound generating means, said echo component having been returned to said collecting means;

subtracting means for subtracting the pseudo echo signal supplied by said filter means from a collected signal supplied by said collecting means; and filter coefficient estimation means for estimating and updating a filter coefficient of said filter means using a smoothed input power value of the generated sound signal, wherein said filter coefficient estimation means calculates said smoothed input power value using a mean power over L samples of the past N samples of the generated sound signal, where L is a number of taps of said filter means and N is a number larger than L and said filter coefficient estimation means estimates filter tap coefficients by a learning identification method and wherein a mean value over L square sums of the generated sound signal of the previous N square sums is used as the value of the square sums in an equation employed for estimating the filter tap coefficients by the learning identification method.

2. An echo removing apparatus for removing an echo produced by the return of sound generated from sound generating means to sound collecting means arranged in proximity to said sound generating means, comprising:

filter means for outputting a pseudo echo signal estimating an echo component derived from a generated sound signal supplied to said sound generating means, said echo component having been returned to said collecting means;

subtracting means for subtracting the pseudo echo signal supplied by said filter means from a collected signal supplied by said collecting means; and filter coefficient estimation means for estimating and updating a filter coefficient of said filter means using a smoothed input power value of the generated sound signal, wherein said filter coefficient estimation means uses an exponentially smoothed square sum of past generated sound signal samples as said smoothed input power value and said filter coefficient estimation means estimates filter tap coefficients by a learning identification method, wherein a current smoothed input power value $Px(k)$ is found by the equation $$Px(k) = \lambda Px(k-1) + |x(k)|^2$$

where $x(k)$ is the current sample of the generated sound signal, $Px(k-1)$ is a smoothed value one sample before the current sample and $\lambda$ is a coefficient such that $0 < \lambda < 1$, and wherein the smoothed value $Px(k)$ is used as the value of the square sum in an equation used for estimating the tap coefficient by the learning identification method.

* * * * *